(12) United States Patent
Mora et al.

(10) Patent No.: US 11,102,466 B2
(45) Date of Patent: *Aug. 24, 2021

(54) DERIVATION OF DISPARITY MOTION VECTOR, 3D VIDEO CODING AND DECODING USING SUCH DERIVATION

(71) Applicant: Orange, Issy-les-Moulineaux (FR)

(72) Inventors: Elie Gabriel Mora, Malakoff (FR); Joel Jung, Le Mesnil Saint Denis (FR)

(73) Assignee: Orange, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,196

(22) Filed: Jan. 30, 2020

(65) Prior Publication Data

US 2020/0186834 A1 Jun. 11, 2020

Related U.S. Application Data

(63) Continuation of application No. 14/769,990, filed as application No. PCT/FR2014/050384 on Feb. 24, 2014, now Pat. No. 10,595,044.

(30) Foreign Application Priority Data

Feb. 26, 2013 (FR) ...................................... 1351701

(51) Int. Cl.
*H04N 13/128* (2018.01)
*H04N 13/122* (2018.01)
(Continued)

(52) U.S. Cl.
CPC ......... *H04N 13/128* (2018.05); *H04N 13/122* (2018.05); *H04N 13/178* (2018.05);
(Continued)

(58) Field of Classification Search
CPC .. H04N 19/597; H04N 13/271; H04N 13/128; H04N 13/178; H04N 2013/0081
See application file for complete search history.

(56) References Cited

U.S. PATENT DOCUMENTS 5,179,441 A 1/1993 Anderson et al.
5,596,321 A 1/1997 Hekstra et al.
(Continued)

FOREIGN PATENT DOCUMENTS

| JP | 2004040785 A | 2/2004 |
|---|---|---|
| WO | 2012020358 A1 | 2/2012 |
| WO | 2013072212 A1 | 5/2013 |

OTHER PUBLICATIONS

Kang J. et al., "3D-CE2.h related: Enhanced Disparity Vector Derivation", 3. JVT-3V Meeting; 103. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG. 16); URL: Http://Phenix.Int-Evry.FR/JCTc/, , No. JCT3V-C0050, Jan. 10, 2013 (Jan. 10, 2013), XP030130466.

(Continued)

*Primary Examiner* — David N Werner
(74) *Attorney, Agent, or Firm* — David D. Brush; Westman, Champlin & Koehler, P.A.

(57) ABSTRACT

A decoding method including: decoding at a current time instant a current image having at least two views respectively representative of a same scene. The decoding includes: deriving a disparity motion vector for a current block; predictively decoding the current block according to the derived disparity motion vector; and during the deriving: constructing a plurality of lists of disparity motion vectors, including at least one list in which at least two disparity motion vectors have been derived respectively according to at least two different estimation methods; applying a first function to the at least two disparity motion vectors of the at (Continued)

least one list, to obtain one disparity motion vector for each of the at least one list, and applying a second function to the disparity motion vectors of the plurality of lists to deliver the derived disparity motion vector.

16 Claims, 5 Drawing Sheets

(51) Int. Cl.
   *H04N 13/178*    (2018.01)
   *H04N 19/597*    (2014.01)
   *H04N 19/56*     (2014.01)
   *H04N 19/527*    (2014.01)
   *H04N 13/00*     (2018.01)
   *H04N 19/513*    (2014.01)

(52) U.S. Cl.
   CPC ......... *H04N 19/597* (2014.11); *H04N 19/521* (2014.11); *H04N 19/527* (2014.11); *H04N 19/56* (2014.11); *H04N 2013/0081* (2013.01)

(56) References Cited

U.S. PATENT DOCUMENTS

| | | | |
|---|---|---|---|
| 5,612,735 A | 3/1997 | Haskell et al. | |
| 5,619,256 A | 4/1997 | Haskell et al. | |
| 10,595,044 B2* | 3/2020 | Mora | H04N 19/597 |
| 2009/0129465 A1 | 5/2009 | Lai et al. | |
| 2012/0002022 A1* | 1/2012 | Ohgose | H04N 13/189 348/51 |
| 2013/0265388 A1 | 10/2013 | Zhang et al. | |
| 2014/0092210 A1* | 4/2014 | Tian | H04N 19/597 348/43 |
| 2014/0133567 A1 | 5/2014 | Rusanovskyy et al. | |
| 2014/0168363 A1* | 6/2014 | Kang | H04N 19/55 348/43 |
| 2014/0169474 A1* | 6/2014 | Kang | H04N 19/11 375/240.16 |
| 2014/0241434 A1* | 8/2014 | Lin | H04N 19/597 375/240.16 |
| 2015/0172714 A1 | 6/2015 | Wu et al. | |
| 2015/0181229 A1 | 6/2015 | Lin et al. | |
| 2015/0201214 A1 | 7/2015 | Lin et al. | |
| 2015/0201215 A1 | 7/2015 | Chen et al. | |
| 2015/0201216 A1 | 7/2015 | Lin et al. | |
| 2015/0249838 A1 | 9/2015 | Chang et al. | |
| 2015/0358636 A1 | 12/2015 | Lin et al. | |
| 2016/0050435 A1* | 2/2016 | Zhang | H04N 19/176 375/240.12 |
| 2016/0182883 A1* | 6/2016 | Zhang | H04N 13/161 375/240.08 |
| 2017/0013275 A1* | 1/2017 | Liu | H04N 13/15 |

OTHER PUBLICATIONS

Kang J. et al., "3D-CE5.h related: Improvements for Disparity Vector Derivation", 2. JCT-3V Meeting; 102. MPEG Meeting; Oct. 13, 2012-Oct. 19, 2012; Shanghai; The Joint Collaborative Team on 3D Video Coding Extension Development of ISO/IEC JTC1/SC29/WG11 and ITU-T SG.16); URL: Http://Phenix.Int-evry.fr/jctc/, , No. JCT3V-B0047, Oct. 10, 2012 (Oct. 10, 2012), XP030130228.

Zhang K. et al., "3D-CE5.h related: Improvement on MV Candidates for 3DVC", 2. JCT-3V Meeting; 102. MPEG Meeting; 13-10-201-Oct. 19, 2012; Shanghai; (The Joint Collaborative Team on 3D Video Coding Extension Development of ISO/IEC JTC1/SC29/WG11 and ITU-T SG.16) URL: Http://Phenix.Int-Evry.FR/JCT2/, , No. JCT3V-B0089, Oct. 9, 2012 (Oct. 9, 2012), XP030130270.

Li Zhang et al., 3D-CE5.h related: Disparity Vector Derivation for Multiview Video and 3DV: 100. MPEG Meeting; Apr. 30, 2012-Apr. 5, 2012; Geneva; (Motion Picture Expert Group or ISO/IEC JTC1/SC29/WG11) No. m24937, May 1, 2012 (May 1, 2012), XP030053280.

B. Bross et al., "High efficiency video coding (HEVC) text specification draft 6," document JCTVC-H1003 of JCT-VC, San Jose CA, USA, Feb. 2012.

English translation of the International Written Opinion dated Aug. 26, 2015 for the corresponding International Application No. PCT/FR2014/050384, filed Feb. 24, 2014.

Decision of Refusal, Japanese Patent Application No. 2015-558534, Japanese Patent Office, dated Oct. 17, 2018.

Office Action dated Apr. 12, 2017 for corresponding U.S. Appl. No. 14/769,990, filed Aug. 24, 2015.

Notice of Allowance dated Oct. 30, 2019 for corresponding U.S. Appl. No. 14/769,990, filed Aug. 24, 2015.

Final Office Action dated May 31, 2019 for corresponding U.S. Appl. No. 14/769,990, filed Aug. 24, 2015.

Office Action dated Dec. 21, 2018 for corresponding U.S. Appl. No. 14/769,990, filed Aug. 24, 2015.

Final Office Action dated Jun. 19, 2018 for corresponding U.S. Appl. No. 14/769,990, filed Aug. 24, 2015.

Office Action dated Jan. 5, 2018 for corresponding U.S. Appl. No. 14/769,990, filed Aug. 24, 2015.

Final Office Action dated Aug. 16, 2017 for corresponding U.S. Appl. No. 14/769,990, filed Aug. 24, 2015.

L. Zhang et al., "3D-CE5.h: Merge candidates derivation from disparity vector", JCT3V-B0048 (Oct. 2012) (Year: 2012).

D. Corrigan, "A Brief Overview of the MPEG2 Standard" (Trinity College Dublin 2012) (Year: 2012).

B. Juurlink et al., "Understanding the Application: An Overview of the H.264 Standard", in Scalable Parallel Programming applied to H.264/AVC Decoding (Springer 2012) (Year: 2012).

Advisory Action dated Dec. 13, 2017 for corresponding U.S. Appl. No. 14/769,990, filed Aug. 24, 2015.

Advisory Action dated Oct. 17, 2018 for corresponding U.S. Appl. No. 14/769,990, filed Aug. 24, 2015.

Advisory Action dated Nov. 14, 2017 for corresponding U.S. Appl. No. 14/769,990, filed Aug. 24, 2015.

* cited by examiner

DERIVATION OF DISPARITY MOTION VECTOR, 3D VIDEO CODING AND DECODING USING SUCH DERIVATION

CROSS-REFERENCE TO RELATED APPLICATIONS

This Application is a continuation of U.S. application Ser. No. 14/769,990, filed Aug. 24, 2015, which is a Section 371 National Stage Application of International Application No. PCT/FR2014/050384, filed Feb. 24, 2014, and published as WO 2014/131975 on Sep. 4, 2014, not in English, the contents of which are incorporated herein by reference in their entireties.

FIELD OF THE INVENTION

The present invention relates generally to the field of image processing in three dimensions (3D), and more particularly to the coding and decoding of 3D digital images and of sequences of 3D digital images. It relates in particular, but not exclusively, to 3D video applications which implement a coding/decoding of images from different cameras.

The invention can notably, but not exclusively, be applied to the video coding implemented in the current AVC and HEVC video coders and their extensions (MVC, 3D-AVC, MV-HEVC, 3D-HEVC, etc), and to the corresponding decoding.

BACKGROUND OF THE INVENTION

A 3D representation of a video can be obtained by multiplexing two views of a same scene (stereo format), recorded by two different cameras of a single stereoscopic device.

Two types of coding, MFC and MVC (respectively "Multiview Frame-compatible Coding" and "Multiview Video Coding"), are generally used to code images composed of two views by exploiting redundancies that exist between the two views.

Although the stereo coding format currently dominates the market, the development of new 3D video services such as 3DTV or FTV require a more fluid representation of three-dimensional scenes, which can be obtained by simultaneously multiplexing more than two views on one 3D device. To this end, at least three images from different points of view can be acquired, encoded then transmitted according to the MVV ("MultiView Video") format and the MVC coding can be used in order to code these images. However, the cost associated with the MVC coding is high, particularly when the number of points of view is great.

A new video coding format, called MVD ("Multiview Video+Depth"), is currently in development. According to this format, depth cameras are used in addition to texture cameras. Each texture component of a given image is associated with a depth component of that image. After coding then transmission, the reconstructed texture and depth components can be transmitted to a synthesizer which generates a requisite number of intermediate views. The advantage of the depth components is that they are purely composed of a brightness channel and that they are primarily composed of smooth regions separated by borders. Thus, they are less costly to code than the texture components. Furthermore, correlations between two texture components or between two depth components, and correlations between a texture component and a depth component can be exploited according to the MVD format, for example by means of a 3DVC ("3D Video Coding") codec, in order to improve the coding efficiency.

Moreover, standards provide for a prediction of coding information for a current block, as a function of coding information from blocks already coded then decoded, again in order to improve the coding efficiency.

One type of coding information is for example a temporal motion vector which describes the motion of a view at the current instant relative to this same view at a preceding instant.

The AMVP ("Advanced Motion Vector Prediction") mode introduces a list of temporal motion vectors that are candidates for predicting the temporal motion vector of the current block of a current view. Only the difference (residual) between the motion vector of the current block and the best candidate temporal motion vector of the list in terms of a bit rate-distortion criterion, and an index signaling this best candidate vector, are transmitted to the decoder, thus reducing the cost of transmission of the information linked to the temporal motion vector of the current block.

The MERGE mode avoids predicting a coding information item of a current block, such as, for example, a temporal motion vector. The MERGE mode in effect enables the current block of a current view to directly inherit from a temporal motion vector chosen from a list of candidate temporal motion vectors which can comprise temporal motion vectors associated respectively with neighboring blocks of the current block, said neighboring blocks having already been coded then decoded, or else associated respectively with blocks corresponding to the current block and contained in frames previously coded then decoded. Such blocks corresponding to the current block are also called collocated blocks in the prior art. The temporal motion vector of the current block that is thus chosen by inheritance from the list of candidate vectors does not then need to be coded in as much as the same principle can be applied in the decoding.

In the 3D-HEVC ("3D-High Efficiency Video Coding") standard currently being prepared, techniques employing both prediction and inheritance are proposed.

The 3D-HEVC standard makes it possible in particular to add, in the list of candidate temporal motion vectors of the AMVP mode or of the MERGE mode, other types of motion vectors such as:
  a temporal motion vector computed from a disparity motion vector, such a candidate motion vector being called "multiview candidate";
  a disparity motion vector.

As is known per se, a disparity motion vector is a motion vector used in the context of an interview prediction. It is a motion vector which describes the motion between the current block of a current dependent view and a block corresponding to this current block in a base view previously coded then decoded, the current dependent view and the base view being each representative of a same scene at the same instant.

Such a disparity motion vector can moreover be used in the context of an interview residual prediction of a current block in a current view. According to this prediction, a search is conducted, in a base view previously coded then decoded, for a block which corresponds to the current block of the current dependent view and which is pointed to by the disparity motion vector of the current block. The residual of this corresponding block is then computed to predict the residual of the current block.

There are different disparity motion vector derivation methods which can be used in the future 3D-HEVC standard.

A first method, called DMDV ("Depth Map Disparity Vector"), consists in estimating a depth map for each dependent view, then in choosing the disparity motion vector which corresponds to the maximum depth value in the colocated block in the estimated depth map. The drawback with this first method is that it is costly in computation and memory terms.

A second method, called NBDV ("Neighbor Disparity Vector"), consists in considering, for a current block to be coded of a current view, five spatial blocks, neighboring the current block in the current view, and two temporal blocks, neighboring the current block in two reference frames previously coded then decoded. The five neighboring blocks are a block $A_0$ situated directly below and to the left of the current block, a block $A_1$ situated directly below the block $A_0$ and situated at the bottom left of the current block, a block $B_0$ situated directly above and to the right of the current block, a block $B_1$ neighboring the block $B_0$ and situated directly above the current block and a block $B_2$ situated directly above and to the left of the current block. The two temporal blocks are a CENTER block situated at the center of the block corresponding to the current block and an RB block situated directly below and to the right of the block corresponding to the current block. The disparity motion vector derivation method according to this second method consists in checking whether one of the blocks $A_0$, $A_1$, $B_0$, $B_1$, $B_2$, CENTER$_1$ (first reference frame), CENTER$_2$ (second reference frame), RB$_1$ (first reference frame) and RB$_2$ (second reference frame) is associated with a disparity motion vector. Such a check is performed in the following particular order: CENTER$_1$, RB$_1$, CENTER$_2$, RB$_2$, $A_1$, $B_1$, $B_0$, $A_0$, $B_2$ for the first dependent view, and RB$_1$, CENTER$_1$, RB$_2$, CENTER$_2$, $A_1$, $B_1$, $B_0$, $A_0$, $B_2$ for the second dependent view. As soon as the first disparity vector is found for one of these blocks in the abovementioned order of checking, it is selected as being the final derived disparity motion vector. The check is then stopped, even if there are still blocks to be checked.

It may be that, on completion of the check, no disparity motion vector is found. In this case, for a block considered out of the blocks $A_0$, $A_1$, $B_0$, $B_1$, $B_2$ and which has been coded using a motion prediction according to the AMVP or MERGE mode, the temporal motion vector associated with this block might have involved the derivation of a disparity motion vector if the multiview candidate was chosen to code this block, as explained above in the introduction. The disparity motion vector derivation method according to the second method then consists in checking whether one of the spatial blocks $A_0$, $A_1$, $B_0$, $B_1$, $B_2$ is associated with a temporal motion vector computed from a disparity motion vector. Such a check is performed in the following particular order: $A_0$, $A_1$, $B_0$, $B_1$, $B_2$. As soon as a temporal motion vector computed from a disparity motion vector is found in association with one of the blocks in the abovementioned order of checking, the disparity motion vector used to derive this temporal motion vector is selected as being the final derived disparity motion vector.

The drawback of this second derivation method is that the first disparity motion vector which, according to the case, is found or read, is maybe not the one which will optimize the efficiency of the coding or of the decoding of the current block.

A third derivation method can be used in the case where a current view has a format of MVD type and its depth component has been coded before its texture component, using a tool called FCO ("Flexible Coding Order"). To this end, to derive the disparity motion vector of a current block of a texture component of a current view, the following steps are carried out:

determination of the block colocated depthwise in the coded then decoded depth component which is associated with the current texture component, determination of a disparity motion vector which corresponds to the maximum depth value in the block colocated depthwise in the depth component, selection of the disparity motion vector determined as final disparity motion vector.

The drawback of such a derivation method is that it is limited to views which necessarily contain texture and depth components. Furthermore, it does not take into account other types of disparity motion vectors, such as, for example, disparity motion vectors used to derive temporal motion vectors.

A fourth derivation method consists in refining the final disparity motion vector which has been obtained using the abovementioned second method NBDV. This method is called DoNBDV ("Depth Oriented Neighbor Disparity Vector"). Such a method is used in the case where a current view has a format of MVD type and its texture component has been coded before its depth component. The final disparity motion vector is then used to determine a depth block in the base view previously coded then decoded, corresponding to the current texture block in the current view. The new final disparity motion vector DoNBDV is the one which corresponds to the maximum depth value in this determined depth block.

The drawback of such a derivation method is that it is limited to views which necessarily contain texture and depth components. Moreover, since it is derived from the second method, it necessarily inherits drawbacks specific thereto.

A fifth derivation method proposed in the document by J. Kang, Y. Chen, L. Zhang and M. Karczewicz, "3D-CE2.h related: Enhanced disparity vector derivation", ITU-T SG 16 WP 3 and ISO/IEC JTC 1/SC 29/WG 11 JCT3V-00050 aims to improve the abovementioned second derivation method. To this end, during the checking of the blocks in the following particular order: CENTER$_1$, RB$_1$, CENTER$_2$, RB$_2$, $A_1$, $B_1$, $B_0$, $A_0$, $B_2$ (first dependent view) or RB1, CENTER1, RB2, CENTER2, A1, B1, B0, A0, B2 (second dependent view), the following are intended to be stored:

at most three spatial disparity motion vectors in a first list called SDVC ("Spatial Disparity Vector Candidates"), and at most three temporal disparity motion vectors in a second list called TDVC ("Temporal Disparity Vector Candidates").

A number of cases can arise on completion of the checking.

In a first case, it may be that, on completion of the checking, no disparity motion vector is found. In this case, the final disparity motion vector is obtained in the same way as in the second method, by selecting the first disparity motion vector used to derive a temporal motion vector associated with the spatial blocks in the following order: $A_0$, $A_1$, $B_0$, $B_1$, $B_2$.

In a second case, a single disparity motion vector has been stored, whether it be an SDVC or TDVC vector. This single stored vector is then selected as final disparity motion vector.

In a third case, if only two disparity motion vectors have been stored, that is to say either two SDVC vectors, or two TDVC vectors, or one SDVC vector and one TDVC vector, the greater of the two vectors is selected as final disparity motion vector.

In a fourth case, if three or more disparity motion vectors have been stored, a median function is applied to the two first TDVC vectors read in memory and to the first SDVC vector read in memory. The resulting vector is then selected as final disparity motion vector. If there are not enough TDVC (respectively SDVC) vectors, the first SDVC (respectively TDVC) vector is used as input for the median function.

Although the selection of the final disparity motion vector is obtained from a plurality of disparity motion vectors contained in one or two lists, contrary to the second derivation method which retains only a single disparity motion vector, the drawback of this fifth method is that the first list of SDVC vectors, just like the second list of TDVC vectors, contains only disparity motion vectors which are used in the context of an interview prediction. In other words, the derivation method according to the fifth method is based only on a plurality of uniform disparity motion vectors. None of the first and second lists contains disparity vectors of another type, such as, for example, those from which temporal motion vectors are derived. The selection of the disparity motion vector according to this fifth method is not therefore optimal.

SUMMARY OF THE INVENTION

An exemplary embodiment of the present invention relates to a disparity motion vector derivation method.

Such a derivation method is noteworthy in that it comprises the steps consisting in:
- constructing at least one list of disparity motion vectors, in which at least two disparity motion vectors have been obtained respectively according to two different estimation methods,
- applying a function to said at least two disparity motion vectors of the list.

Given the diversity of the disparity motion vectors contained in at least one list of disparity vectors, the selection of the final disparity vector is made much finer than that performed in the prior art which proposes only one type of disparity vectors per list.

Such a provision proves particularly advantageous in the case where the disparity motion vector is intended to be added to a set of motion vectors likely to be selected to predict the motion of a current image that has, for example, a format of MVV or MVD type, because the prediction is rendered more reliable and more accurate. The result thereof is a more efficient coding and decoding of the current image.

Such a provision proves also advantageous in the case where the disparity motion vector obtained from the derivation method is used for the prediction of the residual of the current block of a view of a multi-view image, rendering this prediction also more reliable and more accurate.

According to a particular embodiment, when a plurality of lists of disparity motion vectors is constructed, such a plurality of lists comprising at least one list of at least two disparity motion vectors obtained respectively according to two different estimation methods, the abovementioned application step consists in applying a function both to the at least two disparity motion vectors of said list and to at least one disparity motion vector of at least one other list.

By way of alternative to this particular embodiment, when a plurality of lists of disparity motion vectors is constructed, such a plurality of lists comprising at least one list of at least two disparity motion vectors obtained respectively according to two different estimation methods, the abovementioned application step consists in:
- applying a function to the at least two disparity motion vectors of the list, delivering a first disparity motion vector,
- applying a function to at least one disparity motion vector of each of the other lists, delivering a plurality of other disparity motion vectors,
- applying a function both to the first disparity motion vector delivered and the other disparity motion vectors delivered.

Such provisions make it possible to increase the choice and the diversity of the disparity motion vectors by proposing a plurality of lists of disparity motion vectors, for the optimized obtaining of the final disparity vector. Among these various lists, there may coexist several lists of which some contain at least two disparity motion vectors obtained respectively according to two different estimation methods, and some others contain only disparity motion vectors obtained according to the same estimation method.

According to another particular embodiment, a step is carried out, prior to the step of application of a function, which consists in limiting, in at least one list, the number of disparity motion vectors.

Such a provision has the advantage of saving on computation and memory resources in the coder and in the decoder.

According to a first variant of this other particular embodiment, the abovementioned limiting step consists, for example, in limiting, to at most $K_i$ elements, the number of vectors in at least one list of disparity motion vectors.

According to a second variant of this other particular embodiment, the abovementioned limiting step consists in:
- checking, in at least one list of disparity motion vectors, whether at least two disparity motion vectors are redundant with respect to their amplitude and orientation,
- deleting from the list one of the two vectors, if the check is positive.

Such a second variant makes it possible to speed up the obtaining of the final disparity motion vector by the deletion, in at least one list of disparity motion vectors considered, disparity motion vectors for which the amplitude and the orientation are equal or similar, the function then being applied to a smaller number of disparity vectors.

According to a third variant of this other particular embodiment, the limiting step is distinguished from that of the second variant by the fact that it is applied to at least one list of disparity motion vectors which has previously been reduced in terms of number of vectors following the implementation of the first variant limiting step.

Such a third variant makes it possible to further speed up the obtaining of the final disparity motion vector, since it is applied to at least one list of disparity motion vectors whose size has previously been reduced.

The invention relates also to a disparity motion vector derivation device, which is intended to implement the abovementioned derivation method.

Such a derivation device is noteworthy in that it comprises:
- means for constructing at least one list of disparity motion vectors, the abovementioned list comprising at least two disparity motion vectors obtained respectively according to two different estimation methods,
- means for applying a function to said at least two disparity motion vectors of the list.

The invention relates also to a method for decoding a current image comprising at least two views which are respectively representative of a same scene, such a decoding method comprising a step of derivation of a disparity motion vector.

Such a decoding method is noteworthy in that the abovementioned derivation step is performed in accordance with the derivation method according to the invention.

The invention relates also to a device for decoding a current image comprising at least two views which are respectively representative of a same scene, such a device being adapted to implement the abovementioned decoding method and comprising disparity motion vector derivation means.

Such a decoding device is noteworthy in that the abovementioned derivation means are contained in a derivation device according to the invention.

The invention relates also to a method for coding a current image comprising at least two views which are respectively representative of a same scene, such a coding method comprising a step of derivation of a disparity motion vector.

Such a coding method is noteworthy in that the abovementioned derivation step is performed in accordance with the derivation method according to the invention.

The invention relates also to a device for coding a current image comprising at least two views which are respectively representative of a same scene, such a device being adapted to implement the abovementioned coding method and comprising disparity motion vector derivation means.

Such a coding device is noteworthy in that the abovementioned derivation means are contained in a derivation device according to the invention.

The invention also relates to a computer program comprising instructions for implementing the derivation method, the coding method or the decoding method according to the invention, when it is run on a computer.

This program can use any programming language, and be in the form of source code, object code, or intermediate code between source code and object code, such as in a partially compiled form, or in any other desirable form.

The invention also targets a computer-readable storage medium on which is stored a computer program, this program comprising instructions suitable for implementing the coding or decoding method according to the invention, as described above.

The storage medium can be any entity or device capable of storing the program. For example, the medium can comprise a storage means, such as a ROM, for example a CD ROM or a microelectronic circuit ROM, or even a magnetic storage means, for example a USB key or a hard disk.

Also, the storage medium can be a transmissible medium such as an electrical or optical signal, which can be routed via an electric or optical cable, wirelessly or by other means. The program according to the invention can in particular be downloaded over a network of Internet type.

Alternatively, the storage medium can be an integrated circuit in which the program is incorporated, the circuit being adapted to execute or to be used in the execution of the abovementioned coding or decoding method.

The abovementioned coding device and corresponding computer program offer at least the same advantages as those conferred by the coding method according to the present invention.

The abovementioned corresponding derivation device, decoding method, decoding device, coding method, coding device, computer program and storage medium offer at least the same advantages as those conferred by the derivation method according to the present invention.

BRIEF DESCRIPTION OF THE DRAWINGS

Other features and advantages will become apparent on reading preferred embodiments described with reference to the figures in which.

DETAILED DESCRIPTION OF THE DERIVATION METHOD OF THE INVENTION

An embodiment of the invention will now be described, in which the disparity motion vector derivation method according to the invention is for example intended to be implemented in the case of the coding/decoding of an image or of a sequence of images according to a binary stream close to that that is obtained by a coding/decoding conforming, for example, to the 3D-HEVC standard currently being prepared.

To this end, the image or images considered may, for example, be in MVV or MVD format.

In this embodiment, the derivation method according to the invention is for example implemented by software or hardware by modifications to a derivation device contained in a coder/decoder initially conforming to the 3D-HEVC standard. The derivation method according to the invention is represented in the form of an algorithm comprising steps S1 to S3 as represented in FIG. 1.

Figure 2:
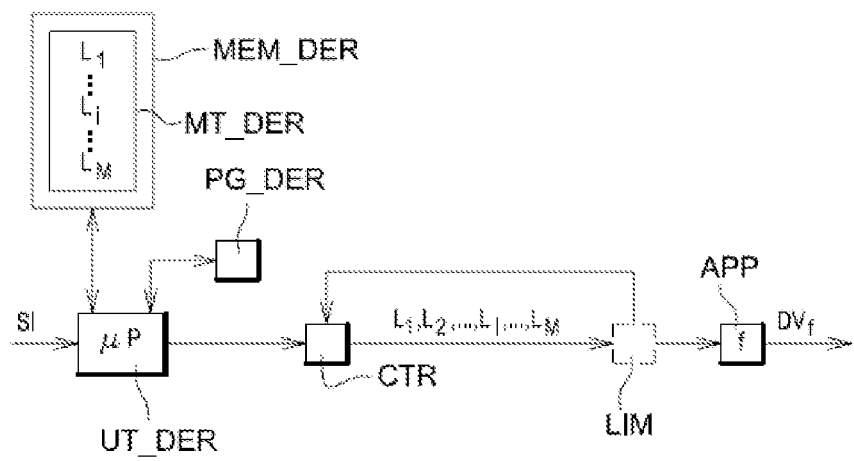
FIG. 2 represents an embodiment of a derivation device according to the invention.

According to the embodiment of the invention, the derivation method according to the invention is implemented in a derivation device DER represented in FIG. 2.

As illustrated in FIG. 2, such a derivation device comprises a memory MEM_DER comprising a buffer memory MT_DER, a processing unit UT_DER equipped for example with a microprocessor µP and driven by a computer program PG_DER which implements the derivation method according to the invention. On initialization, the code instructions of the computer program PG_DER are, for example, loaded into a RAM memory before being executed by the processor of the processing unit UT_DER.

Figure 1:
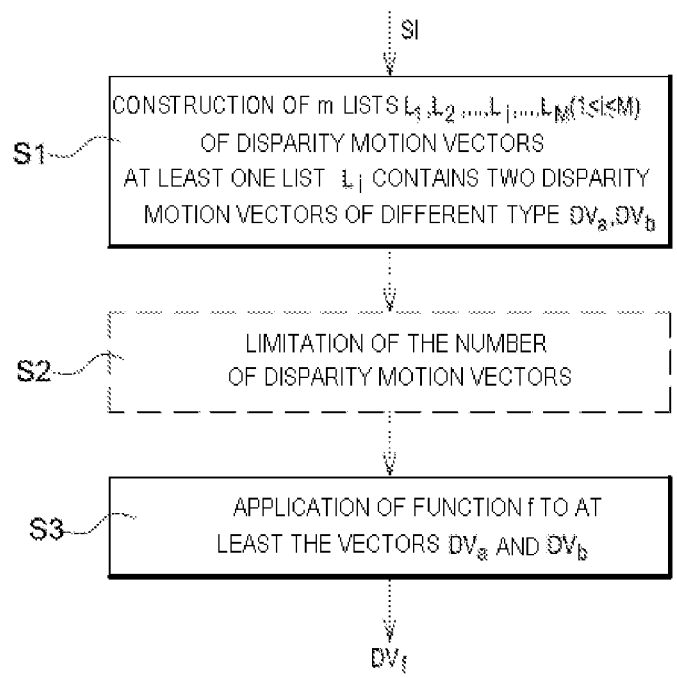
FIG. 1 represents steps of the derivation method according to the invention.

The derivation method represented in FIG. 1 applies to any current image of MVV or MVD type of a sequence SI of images to be coded.

Referring to FIG. 1, during a step S1, a list of disparity motion vectors, or else a plurality of lists of disparity motion vectors $L_1, L_2, \ldots, L_i, \ldots L_M$, with $1 \leq i \leq M$, is/are constructed. Said single list or at least one list $L_1$ out of the m lists contains at least two disparity motion vectors $DV_a$ and $DV_b$ of different types, that is to say which have been obtained respectively according to two different estimation methods.

The vectors $DV_a$ and $DV_b$ may have been obtained for example at the end of one of the following derivation methods which have been described in the introduction of the description:

DMDV,
DCP ("Disparity-Compensated Prediction"), either after consideration of the temporal collocated blocks $CENTER_1$, $RB_1$, $RB_2$, $CENTER_2$, or after consideration of the spatial neighboring blocks $A_1$, $B_1$, $B_0$, $A_0$, $B_2$,
NBDV,
FCO,
DoNBDV,
etc. . . .

As a variant, it is also possible to consider, in the abovementioned list, at least one disparity motion vector which has been obtained by a shift, by one or more pixels on x or on y, of a disparity motion vector obtained according to one of the derivation methods listed above. This is then a shifted derivated motion vector.

In the case for example where a single list $L_1$ is constructed, said list can comprise, for example, six disparity motion vectors $DV_{11}$, $DV_{12}$, $DV_{13}$, $DV_{14}$, $DV_{15}$, $DV_{16}$, in which:
  $DV_{11}$ has been obtained according to the abovementioned DMDV derivation method;
  $DV_{12}$ and $DV_{13}$ have been obtained using a disparity-compensated prediction DCP;
  $DV_{14}$ and $DV_{15}$ have been obtained according to the abovementioned NBDV derivation method;
  $DV_{16}$ has been obtained according to the abovementioned DoNBDV derivation method.

In the case for example where several lists are constructed, for example three lists $L_1$, $L_2$ and $L_3$, at least one of said lists comprises at least two disparity motion vectors of different types. In this example, the two lists $L_1$ and $L_3$ each comprise at least two disparity motion vectors of different types. The lists $L_1$ to $L_3$ are constructed such that:
  $L_1$ comprises, for example, four disparity motion vectors $DV_{11}$, $DV_{12}$, $DV_{13}$, $DV_{14}$, in which $DV_{11}$ and $DV_{12}$ have been obtained according to the abovementioned NBDV derivation method and in which $DV_{13}$ and $DV_{14}$ have been obtained using a disparity-compensated prediction DCP;
  $L_2$ comprises, for example, two disparity motion vectors $DV_{21}$, $DV_{22}$, in which $DV_{21}$ and $DV_{22}$ have been obtained according to the abovementioned DMDV derivation method;
  $L_3$ comprises, for example, two disparity motion vectors $DV_{31}$, $DV_{32}$, in which $DV_{31}$ and $DV_{32}$ have been obtained respectively according to the abovementioned DoNBDV and FCO derivation methods.

Referring to FIG. 2, said construction step S1 is implemented by a construction module CTR which is driven by the microprocessor μP of the processing unit UT_DER.

The list $L_1$ or said lists $L_1, L_2, \ldots, L_M$ that have thus been constructed are stored in the buffer memory MT_DER of the derivation device of FIG. 2.

Referring to FIG. 1, during a step S2, in at least one of the abovementioned lists a limitation is applied to the number of disparity motion vectors.

Referring to FIG. 2, said limiting step S2 is implemented by a limiting module LIM which is driven by the microprocessor μP of the processing unit UT_DER.

Such a step S2 is optional and, for this reason, is represented in dotted lines in FIG. 1, like the limiting module LIM in FIG. 2. Such a step S2 will be described in more detail hereinbelow in the description.

Referring to FIG. 1, during a step S3, a function f is applied to said at least two disparity motion vectors $DV_a$ and $DV_b$ of different type of at least one list.

Referring to FIG. 2, said application step S3 is implemented by a function application module APP which is driven by the microprocessor μP of the processing unit UT_DER.

Following the step S3, a final disparity motion vector $DV_f$ is delivered.

Said function f is a mathematical or statistical function such as a median, a max, a min, an average, a weighted average, a weighted median, etc. In the case of an average or of a weighted median, the weighting can be a function of the type of disparity motion vectors considered.

As a variant, said function f is a predetermined coding performance criterion, for example the bit rate/distortion cost or else an efficiency/complexity trade-off, which are criteria well known to those skilled in the art.

In the case for example where a single list $L_1$ is constructed, such as, for example, the abovementioned list which comprises, for example, six disparity motion vectors $DV_{11}$, $DV_{12}$, $DV_{13}$, $DV_{14}$, $DV_{15}$, $DV_{16}$, the function f can be applied to all the disparity motion vectors considered in this list or else to some of them.

In the case for example where several lists are constructed, such as, for example, the abovementioned three lists $L_1$, $L_2$ and $L_3$, several nonlimiting cases can arise.

According to a first case, the abovementioned function f is applied to all the disparity motion vectors considered in each of the abovementioned lists $L_1$, $L_2$ and $L_3$.

According to a second case, the abovementioned function f is applied to some disparity motion vectors considered in each of the abovementioned lists $L_1$, $L_2$ and $L_3$, provided that the function f is applied to at least two disparity motion vectors of different type considered in a same list, the list $L_3$ for example.

According to a third case:
  a function f1 of the same type as the function f is applied to all the disparity motion vectors of the list $L_1$, delivering a first disparity motion vector,
  a function f2 of the same type as the function f is applied to all the disparity motion vectors of the list $L_2$, delivering a second disparity motion vector,
  a function f3 of the same type as the function f is applied to all the disparity motion vectors of the list $L_3$, delivering a third disparity motion vector,
  a function f4 of the same type as the function f is applied to the first, second and third disparity motion vectors delivered.

According to a fourth case, the functions f1, f2 and f3 are applied to some disparity motion vectors considered in each of the abovementioned lists $L_1$, $L_2$, $L_3$, provided that at least one of the functions f1, f3 is applied to at least two disparity motion vectors of different type considered in the list $L_1$, $L_3$ which is associated with it.

Different variant embodiments of the step S2 of limitation of the number of disparity motion vectors will now be described.

According to a first variant embodiment, the step S2 is implemented upon the construction of the list $L_1$ or of the m lists $L_1, L_2, \ldots, L_M$ in the abovementioned step S1. Such a step S2 consists, for example, in:
  limiting, to a maximum of $K_i$ elements, the number of vectors in the list $L_1$ or else, in the case where m lists $L_1, L_2, \ldots, L_M$ are constructed, in at least one list $L_i$ considered, with, for example, $K_i=3$, so as to obtain a smaller list $L'_1$ or else at least a smaller list $L'_i$, deleting at least one type of disparity motion vectors considered, for example the motion vectors obtained at the end of the abovementioned DMDV derivation method, deleting at least one of the m lists $L_1, L_2, \ldots, L_M$ in the case where m lists are constructed.

According to a second variant embodiment, the step S2 is implemented following the abovementioned step S1.

The step S2 consists, for example in:

checking, in the list $L_1$, or else, in the case where m lists $L_1, L_2, \ldots, L_i, \ldots, L_M$ are constructed, in at least one list $L_i$ considered, whether at least two disparity motion vectors are redundant with respect to their amplitude and orientation, deleting from said list one of said two redundant vectors, if the check is positive.

On completion of the step S2 according to the second variant, a smaller list $L''_1$ or else at least one smaller list $L''_i$ is obtained.

According to a third variant embodiment, such a step S2 consists, for example, in:

checking, in the smaller list or else in at least one smaller list whether at least two disparity motion vectors are redundant with respect to their amplitude and orientation, deleting from said smaller list one of said two redundant vectors, if the check is positive.

According to a fourth variant embodiment, for a list considered, smaller or not, the redundancy check can be performed on only a certain number of disparity motion vectors contained in the list.

Three different scenarios of derivation methods according to the invention will now be described as nonlimiting examples.

Scenario 1

During the abovementioned step S1, a single list $L_1$ is constructed which contains disparity motion vectors obtained according to the abovementioned NBDV derivation method. Such a list contains, for example, at least one vector obtained by DCP prediction and at least one vector obtained by derivation of a temporal motion vector.

During the abovementioned step S2, the redundancy of the vectors contained in the list $L_1$ is checked, in order to delete the redundancy vectors therefrom.

During the abovementioned step S3, a median function is applied to the vectors contained in the list $L_1$ which has possibly been reduced in the step S2.

Scenario 2

During the abovementioned step S1, two lists $L_1$ and $L_2$ are constructed, The list $L_1$ contains disparity motion vectors obtained according to the abovementioned NBDV derivation method. Such a list contains, for example, at least one vector obtained by DCP prediction and at least one vector obtained by derivation of a temporal motion vector. The list $L_2$ contains at least three disparity motion vectors obtained respectively according to the DMDV, FCO and DoNBDV derivation methods.

During the abovementioned step S2, the redundancy of the vectors contained only in the list $L_1$ is checked, in order to delete the redundant vectors therefrom.

During the abovementioned step S3, an average function is applied both to the first two vectors contained in the list $L_1$ which has possibly been reduced in the step S2 and to the first vector of the list $L_2$.

Scenario 3

During the abovementioned step S1, three lists $L_1, L_2, L_3$ are constructed. The list $L_1$ contains the disparity motion vectors obtained according to the abovementioned NBDV derivation method. Such a list contains, for example, at least one vector obtained by DCP prediction and at least one vector obtained by derivation of a temporal motion vector. The list $L_2$ contains at least two disparity motion vectors obtained respectively according to the DMDV and DoNBDV derivation methods. The list $L_3$ contains at least one disparity motion vector obtained according to the FCO derivation method.

The redundancy checking step S2 is not implemented.

During the abovementioned step S3, a first median function f1 is applied to the vectors contained in the list $L_1$ delivering a first disparity motion vector, a second median function f2 is applied to the vectors contained in the list $L_2$ delivering a second disparity motion vector, and a third median function f3 is applied to the vectors contained in the list $L_3$ delivering a third disparity motion vector. Then, a fourth median function f4 is applied at the same time to the first, second and third disparity motion vectors delivered.

Detailed Description of the Coding Method of the Invention

Figure 3:
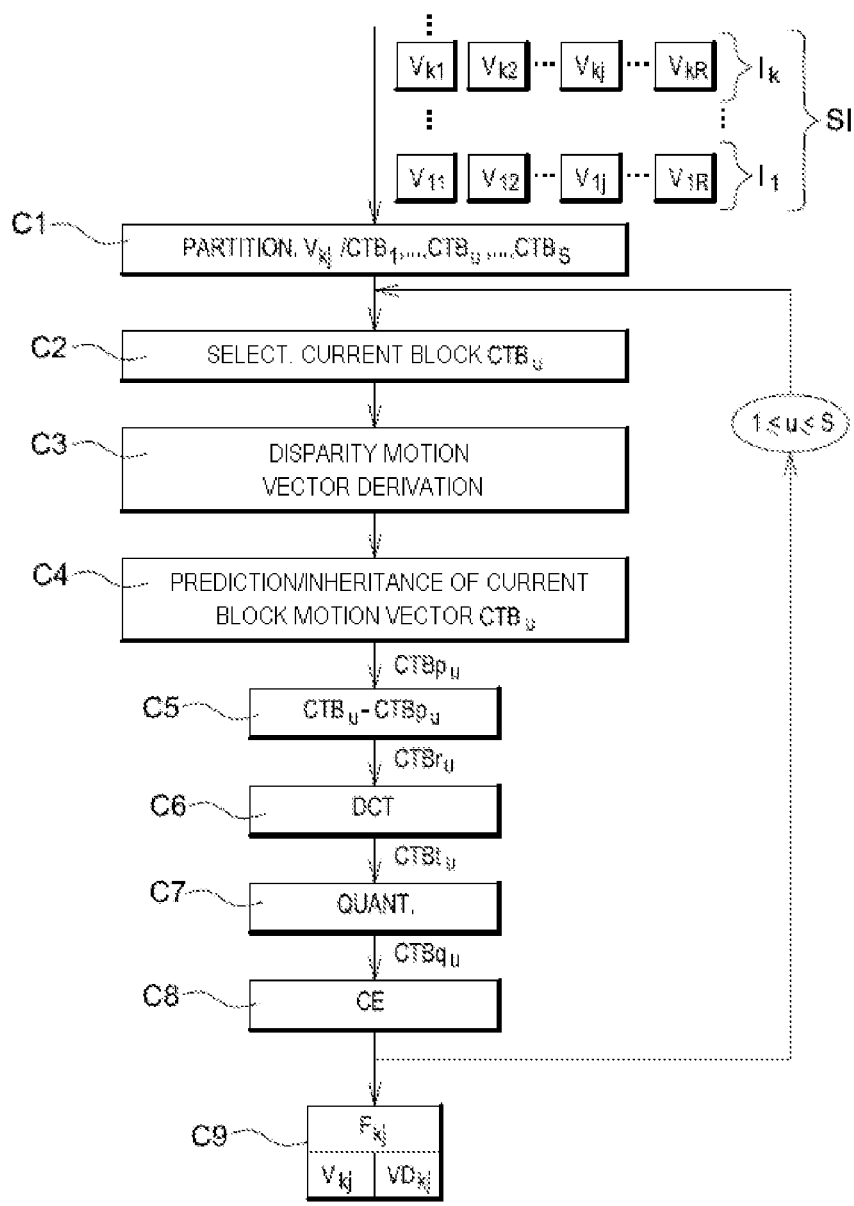
FIG. 3 represents the steps of the coding method according to the invention.

An embodiment of the invention will now be described, in which the coding method according to the invention is used to code a sequence of images according to a bit stream close to that that is obtained by a coding according to the 3D-HEVC standard currently being prepared. In this embodiment, the coding method according to the invention is for example implemented by software or hardware by modifications to a coder initially conforming to the HEVC 3D standard. The coding method according to the invention is represented in the form of an algorithm comprising steps C1 to C9 as represented in FIG. 3.

Figure 4:
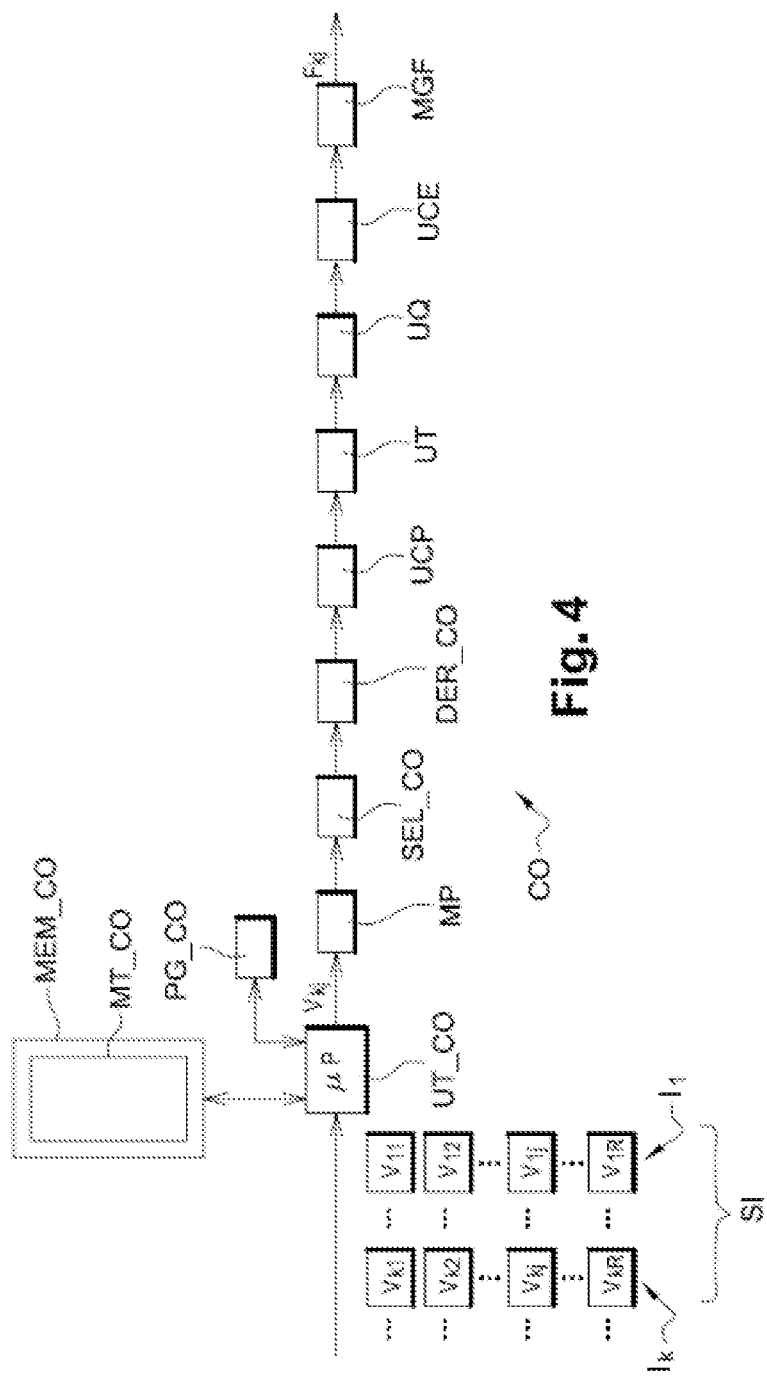
FIG. 4 represents an embodiment of a coding device suitable for implementing the coding method represented in FIG. 3.

According to the embodiment of the invention, the coding method according to the invention is implemented in a coding device CO represented in FIG. 4. Such a coding device comprises a memory MEM_CO comprising a buffer memory MT_CO, a processing unit UT_CO equipped for example with a microprocessor µP and driven by a computer program PG_CO which implements the coding method according to the invention. On initialization, the code instructions of the computer program PG_CO are for example loaded into a RAM memory before being executed by the processor of the processing unit UT_CO.

As already explained above in the description, the coding method according to the invention is intended to be applied to an image or to a sequence of images SI according to a bit stream close to that that is obtained by a coding/decoding conforming, for example, to the 3D-HEVC standard currently being prepared.

The image or images considered can, for example, be in the MVV or MVD format. Referring to FIG. 3, the sequence of images SI comprises a number N (N≥1) of images such that:

at the instant $t_1$, the image $I_1$ comprises a plurality of R views $V_{11}, V_{12}, \ldots, V_{1j}, \ldots, V_{1R}$,

. . .

at the instant $t_k$, the image $I_k$ comprises a plurality of R views $V_{k1}, V_{k2}, \ldots, V_{kj}, \ldots, V_{kR}$,
. . .
at the instant $t_N$, the image $I_N$ comprises a plurality of R views $V_{N1}, V_{N2}, \ldots, V_{Nj}, \ldots, V_{NR}$,
with $1 \leq j \leq R$ and $1 \leq k \leq N$.

A current image $I_k$ at the instant $t_k$ is then considered in the sequence of images SI.

During a preliminary step C1 represented in FIG. 3, as is known per se, a current view $V_{kj}$ of the current image $I_k$ belonging to the sequence SI of images is partitioned into a plurality of blocks $CTB_1, CTB_2, CTB_U, \ldots, CTB_S$, for example of 64×64 pixel size ($1 \leq u \leq S$). Such a partitioning step is implemented by a partitioning software module MP represented in FIG. 4, said module being driven by the microprocessor μP of the processing unit UT_CO.

It should be noted that, within the meaning of the invention, the term "block" signifies coding unit. The latter terminology is notably used in the HEVC standard, for example in the document "B. Bross, W.-J. Han, J.-R. Ohm, G. J. Sullivan, and T. Wiegand, "High efficiency video coding (HEVC) text specification draft 6," document JCTVC-H1003 of JCT-VC, San Jose Calif., USA, February 2012".

In particular, such a coding unit combines sets of pixels of rectangular or square form, also called blocks, macroblocks, or else sets of pixels in other geometrical forms.

During a step C2 represented in FIG. 3, a block $CTB_u$ of the current view $V_{kj}$ is selected as current block to be coded.

Referring to FIG. 4, said selection step C2 is implemented by a selection module SEL_CO of the coder CO, said module being driven by the microprocessor μP of the processing unit UT_CO.

Referring to FIG. 3, during a step C3, a disparity motion vector is derived. Such a step is performed in accordance with the derivation method according to the invention.

Referring to FIG. 4, said derivation step C3 is implemented by a derivation module DER_CO that is in all respects identical to the derivation module DER of FIG. 2, said module DER_CO being driven by the microprocessor μP of the processing unit UT_CO.

Referring to FIG. 3, during a step C4, a predictive coding of the current block $CTB_u$ is carried out by known intra and/or inter prediction techniques, during which the current block $CTB_u$ is predicted relative to at least one block previously coded then decoded.

Referring to FIG. 4, said predictive coding step C4 is implemented by a predictive coding unit UCP which is able to perform a predictive coding of the current block, according to the conventional prediction techniques, such as, for example, in intra and/or inter mode. Said UCP module is driven by the microprocessor μP of the processing unit UT_CO.

According to a first variant embodiment, a motion vector of the current block $CTB_u$ is determined according to the AMVP mode, that is to say predicted by selection of a motion vector in a list of motion vectors that may comprise temporal motion vectors and/or disparity motion vectors, as well as the final disparity motion vector $DV_f$ obtained following the derivation step C3.

According to a second variant embodiment, a motion vector of the current block $CTB_u$ is determined according to the MERGE mode, that is to say by the inheritance of a motion vector contained in a list of motion vectors that may comprise temporal motion vectors and/or disparity motion vectors, as well as the final disparity motion vector $DV_f$ obtained following the derivation step C3.

Out of the possible predictions for a current block which have been determined in the step C4 the optimum prediction is chosen according to a bit rate/distortion criterion that is well known to those skilled in the art.

Figure 5:
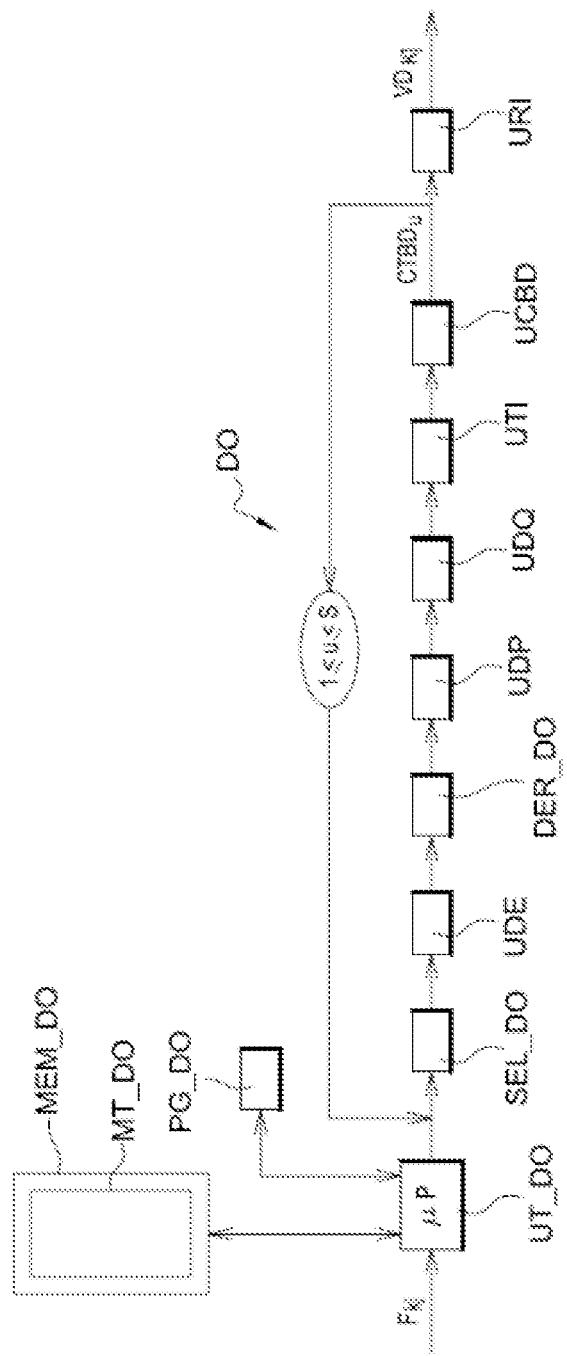
FIG. 5 represents an embodiment of a decoding device according to the invention.

Said abovementioned predictive coding step makes it possible to construct a predicted block $CTBp_u$ which is an approximation of the current block $CTB_u$. The information concerning this predictive coding will subsequently be inscribed in a stream transmitted to a decoder DO as represented in FIG. 5. In the case where the disparity motion vector obtained using the derivation method according to the invention is selected as optimal prediction vector, such information comprises the positioning index of this vector in the list which contains it. In the particular case where several lists have been constructed, the information also comprises the index of the list which contains the selected vector.

During a step C5 represented in FIG. 3, the predictive coding unit UCP of FIG. 4 proceeds to subtract the predicted block $CTBp_u$ from the current block $CTB_u$ to produce a residue block $CTBr_u$.

During a step C6 represented in FIG. 3, the residue block $CTBr_u$ is transformed according to a conventional direct transformation operation such as, for example, a discrete cosine transformation of DCT type, to produce a transformed block $CTBt_u$.

Said step C6 is implemented by a transformation unit UT represented in FIG. 4, said unit being driven by the microprocessor μP of the processing unit UT_CO.

During a step C7 represented in FIG. 4, the transformed block $CTBt_u$ is quantized, according to a conventional quantization operation, such as for example a scalar quantization. A block of quantized coefficients $CTBq_u$ is then obtained.

Said step C7 is implemented by a quantization unit UQ represented in FIG. 4, said unit being driven by the microprocessor μP of the processing unit UT_CO.

During a step C8 represented in FIG. 3, an entropic coding of the block of quantized coefficients $CTBq_u$ is performed. In the preferred embodiment, this is a CABAC entropic coding that is well known to those skilled in the art.

The step C8 is implemented by an entropic coding unit UCE represented in FIG. 4, said unit being driven by the microprocessor μP of the processing unit UT_CO.

The coding substeps which have just been described above are implemented for all the blocks to be coded of the current image $I_k$ considered.

The coding steps C2 to C8 which have just been described above are implemented for all the blocks to be coded of the current view $V_{kj}$ considered. During a step C9 represented in FIG. 3, a stream of bits $F_{kj}$ representing the coded current view $V_{kj}$ is produced, as is a decoded version $VD_{k1}$ thereof, which is likely to be reused as reference view to code other views of the sequence SI of images.

Referring to FIG. 4, the step of production C9 of a current stream $F_{kj}$ is implemented by a stream generation module MGF which is designed to produce streams of data, such as bits for example. Said MGF module is driven by the microprocessor μP of the processing unit UT_CO.

The current stream $F_{kj}$ is then transmitted by a communication network (not represented), to a remote terminal. The latter comprises the decoder DO represented in FIG. 5 which will be described in more detail hereinbelow in the description.

Detailed Description of an Embodiment of the Decoding Part

An embodiment of the decoding method according to the invention will now be described, in which the decoding method is implemented by software or hardware by modifications to a decoder initially conforming to the 3D-HEVC standard.

Figure 6:
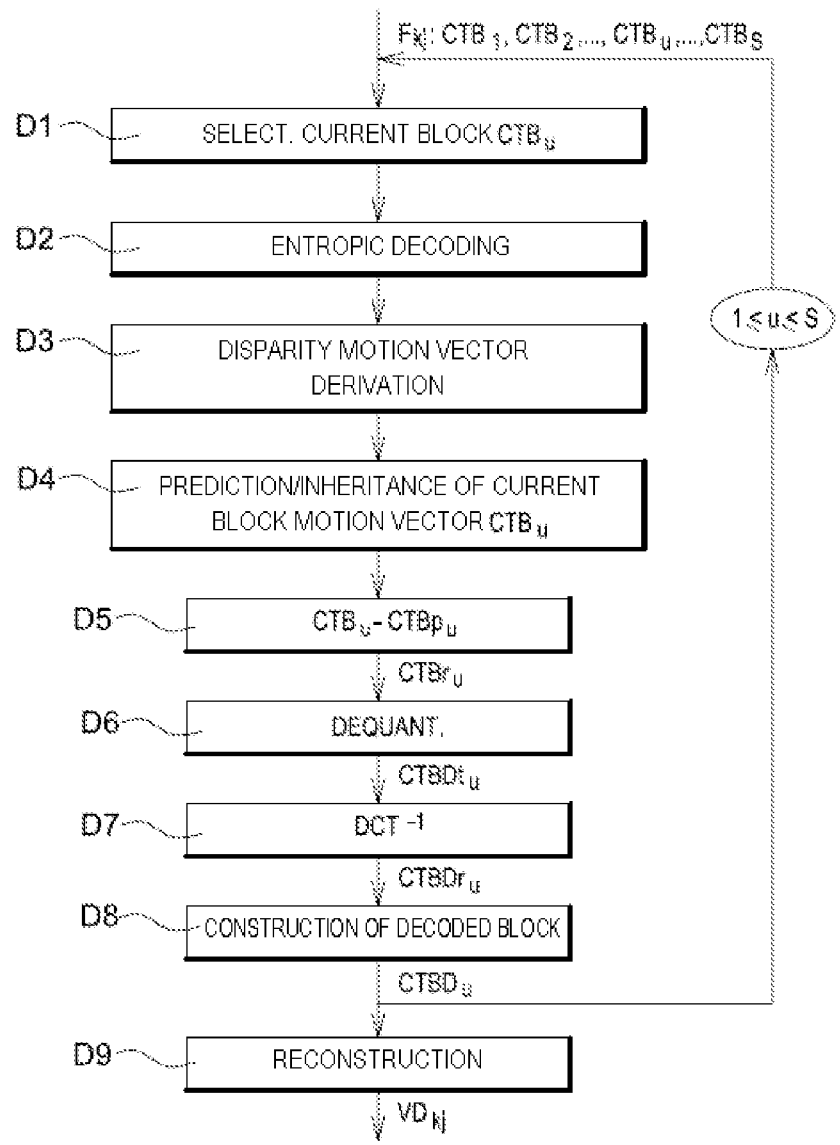
FIG. 6 represents the decoding steps suitable for being implemented in the decoding device represented in FIG. 5.

The decoding method according to the invention is represented in the form of an algorithm comprising steps D1 to D9 represented in FIG. 6.

According to the embodiment of the invention, the decoding method according to the invention is implemented in a decoding device DO represented in FIG. 5.

As illustrated in FIG. 5, such a decoding device comprises a memory MEM_DO comprising a buffer memory MT_DO, a processing unit UT_DO equipped for example with a microprocessor μP and driven by a computer program PG_DO which implements the decoding method according to the invention. On initialization, the code instructions of the computer program PG_DO are, for example, loaded into a RAM memory before being executed by the processor of the processing unit UT_DO.

The decoding method represented in FIG. 6 is applied to any current image of said sequence S1 of images to be decoded.

To this end, the information representative of the current image $I_k$ to be decoded is identified in the stream $F_{kj}$ received at the decoder DO. During a step D1 represented in FIG. 6, a block $CTB_u$ to be decoded is selected in the stream $F_{k1}$.

Referring to FIG. 5, said selection step D1 is implemented by a selection module SEL_DO of the decoder DO, said module being driven by the microprocessor μP of the processing unit UT_DO.

During a step D2 represented in FIG. 6, an entropic decoding of the syntax elements linked to the current block $CTB_u$ is performed by reading of the stream $F_k$ using a stream pointer.

More specifically, the syntax elements linked to the current block are decoded by a CABAC entropic decoding unit UDE as represented in FIG. 5, said unit being driven by the microprocessor μP of the processing unit UT_DO. Such a unit is well known as such and will not be described more.

Referring to FIG. 6, during a step D3, a disparity motion vector is derived. Such a step is performed in accordance with the derivation method according to the invention. Referring to FIG. 5, said derivation step D3 is implemented by a derivation module DER_DO that is in all respects identical to the derivation module DER of FIG. 2, said module DER_DO being driven by the microprocessor μP of the processing unit UT_DO.

During a step D4 represented in FIG. 6, a predictive decoding of the current block $CTB_u$ is performed by known intra and/or inter prediction techniques, during which the block $CTB_u$ is predicted relative to at least one previously decoded block.

During this step, the predictive decoding is performed using syntax elements decoded in the preceding step and notably comprising the type of prediction (inter or intra).

In the case where a prediction or else a motion vector inheritance is applied to the current block $CTB_u$ and in the case where the disparity motion vector obtained using the derivation method according to the invention has been selected in coding as vector optimizing the prediction according to the bit rate-distortion criterion, said decoded syntax elements comprise the positioning index of this vector in the list of disparity motion vectors which contains it. In the particular case where several lists have been constructed, said decoded syntax elements also comprise the index of the list which contains the selected vector.

Said abovementioned predictive decoding step D4 makes it possible to construct a predicted block $CTBp_u$ relative to a previously decoded block.

Said step D4 is implemented by a predictive decoding unit UDP as represented in FIG. 5, said unit being driven by the microprocessor μP of the processing unit UT_DO.

During a step D5 represented in FIG. 6, the predictive decoding unit UDP of FIG. 5 proceeds to subtract the predicted block $CTBp_u$ from the current block $CTB_u$ to produce a residue block $CTBr_u$.

During a step D6 represented in FIG. 6, the quantized residue block $CTBr_u$ is dequantized according to a conventional dequantization operation which is the reverse operation of the quantization performed in the abovementioned step C7, to produce a decoded dequantized block $CTBDt_u$.

Said step D6 is implemented by a dequantization unit UDQ represented in FIG. 5, said unit being driven by the microprocessor μP of the processing unit UT_DO.

During a step D7 represented in FIG. 6, a reverse transformation of the dequantization block $CTBDt_u$ is performed, which is the reverse operation of the direct transformation performed in the abovementioned coding step C6. A decoded residue block $CTBDr_u$ is then obtained.

Said step D7 is implemented by a reverse transformation unit UTI represented in FIG. 5, said unit being driven by the microprocessor μP of the processing unit UT_DO.

During a step D8 represented in FIG. 6, the decoded block $CTBD_u$ is constructed by adding the decoded residue block $CTBDr_u$ to the predicted block $CTBp_u$. The decoded block $CTBD_u$ is thus made available to be used by the decoder DO of FIG. 5.

The step D8 is implemented by a decoded block construction unit UCBD as represented in FIG. 5, said unit being driven by the microprocessor μP of the processing unit UT_DO.

The decoding steps D1 to D8 which have just been described above are once again implemented for all the blocks to be decoded of the current view $V_{kj}$ considered.

Referring to FIG. 6, during a step D9, the reconstruction of a decoded view $VD_{k1}$ is performed.

Referring to FIG. 5, the reconstruction step D9 is implemented by a reconstruction unit URI which writes the decoded blocks into a decoded view $VD_{k1}$ as these blocks become available. Said unit is driven by the microprocessor μP of the processing unit UT_DO.

It goes without saying that the embodiments which have been described above have been given purely in an indicative and nonlimiting manner, and that numerous modifications can easily be made by those skilled in the art without in any way departing from the framework of the invention.

What is claimed is:

1. A decoding method comprising:
decoding with a decoding device a current image at a current time instant comprising at least two views which are respectively representative of a same scene, said decoding comprising:
derivation of a disparity motion vector, referred to as a final derived disparity motion vector, for a current block of a current view of the current image;
predictively decoding the current block according to said final derived disparity motion vector; and
during said derivation, the decoding device performing acts of:
constructing a plurality of lists of disparity motion vectors, said plurality of lists comprising at least one list in which at least two disparity motion vectors have been derived respectively according to at least two different estimation methods;

applying a first function to the disparity motion vectors of each list to obtain one intermediate disparity motion vector per list, wherein the first function is applied to said at least two disparity motion vectors of said at least one list in which at least two disparity motion vectors have been derived respectively according to at least two different estimation methods; and applying a second function to said intermediate disparity motion vectors of said plurality of lists to deliver the final derived disparity motion vector.

2. The decoding method as claimed in claim 1, wherein said acts of applying the first and second functions further comprise:

applying the first function to said at least two disparity motion vectors of said at least one list in which at least two disparity motion vectors have been derived respectively according to at least two different estimation methods, delivering a first disparity motion vector, applying a third function to at least two disparity motion vectors of at least one of the other lists of the plurality of lists, delivering at least one other disparity motion vector, applying the second function both to said first disparity motion vector delivered and the at least one other disparity motion vector delivered, the first, second and third functions being of a same function type.

3. The decoding method as claimed in claim 1, comprising, prior to said act of applying the first function, limiting, in the at least one list, the number of disparity motion vectors.

4. The decoding method as claimed in claim 3, said limiting comprising:

checking, in the at least one list of disparity motion vectors in which at least two disparity motion vectors have been derived respectively according to at least two different estimation methods, whether at least two disparity motion vectors are redundant with respect to their amplitude and orientation, deleting from said at least one list one of said at least two disparity motion vectors, if the check is positive.

5. The decoding method as claimed in claim 1, wherein said at least two different estimation methods are selected from the group consisting of Depth Map Disparity Vector (DMDV), Disparity-Compensated Prediction (DCP), Neighbor Disparity Vector (NBDV), Flexible Coding Order (FCO) and Depth Oriented Neighbor Disparity Vector (DoNBDV).

6. A device for decoding a current image at a current time instant comprising at least two views which are respectively representative of a same scene, said decoding device comprising:

a processor; and a non-transitory computer-readable medium comprising instructions stored thereon, which when executed by the processor configure the processor to:

construct a plurality of lists of disparity motion vectors, said plurality of lists comprising at least one list comprising at least two disparity motion vectors derived respectively according to at least two different estimation methods, apply a first function the disparity motion vectors of each list to obtain one intermediate disparity motion vector per list, wherein the first function is applied to said at least two disparity motion vectors of said at least one list in which at least two disparity motion vectors have been derived respectively according to at least two different estimation methods, apply a second function to said intermediate disparity motion vectors of said plurality of lists to deliver a final derived disparity motion vector, and predictively decode a current block of a current view of the current image according to said final derived disparity motion vector.

7. The device as claimed in claim 6, wherein said at least two different estimation methods are selected from the group consisting of Depth Map Disparity Vector (DMDV), Disparity-Compensated Prediction (DCP), Neighbor Disparity Vector (NBDV), Flexible Coding Order (FCO) and Depth Oriented Neighbor Disparity Vector (DoNBDV).

8. A non-transitory computer-readable storage medium on which is stored a computer program comprising program code instructions for execution of a method when said program is run by a computer, wherein said instructions comprise:

instructions that configure the computer to decode a current image at a current time instant comprising at least two views that are respectively representative of a same scene, wherein decoding comprises:

deriving a disparity motion vector, referred to as a final derived disparity motion vector, for a current block of a current view of the current image;

predictively decoding the current block according to said final derived disparity motion vector; and during said deriving, performing acts of:

constructing a plurality of lists of disparity motion vectors, said plurality of lists comprising at least one list in which at least two disparity motion vectors have been derived respectively according to at least two different estimation methods, applying a first function to the disparity motion vectors of each list to obtain one intermediate disparity motion vector per list, wherein the first function is applied to said at least two disparity motion vectors of said at least one list in which at least two disparity motion vectors have been derived respectively according to at least two different estimation methods, and applying a second function to said intermediate disparity motion vectors of said plurality of lists to deliver the final derived disparity motion vector.

9. The non-transitory computer-readable storage medium as claimed in claim 8, wherein said at least two different estimation methods are selected from the group consisting of Depth Map Disparity Vector (DMDV), Disparity-Compensated Prediction (DCP), Neighbor Disparity Vector (NBDV), Flexible Coding Order (FCO) and Depth Oriented Neighbor Disparity Vector (DoNBDV).

10. A coding method comprising:

coding with a coding device a current image at a current time instant comprising at least two views which are respectively representative of a same scene, wherein coding comprises:

derivation of a disparity motion vector, referred to as a final derived disparity motion vector, for a current block of a current view of the current image;

predictively coding the current block according to said final derived disparity motion vector; and during said derivation, said coding device performing acts of:

constructing a plurality of lists of disparity motion vectors, said plurality of lists comprising at least one list in which at least two disparity motion vectors have been derived respectively according to at least two different estimation methods, applying a first function to the disparity motion vectors of each list to obtain one intermediate disparity motion vector per list, wherein the first function is applied to said at least two disparity motion vectors of said at least one list in which at least two disparity motion vectors have been derived respectively according to at least two different estimation methods, and applying a second function to said intermediate disparity motion vectors of said plurality of lists to deliver the final derived disparity motion vector.

11. The coding method as claimed in claim 10, wherein said acts of applying the first and second functions further comprise:

applying the first function to said at least two disparity motion vectors of said at least one list in which at least two disparity motion vectors have been derived respectively according to at least two different estimation methods, delivering a first disparity motion vector, applying a third function to at least two disparity motion vectors of at least one of the other lists of the plurality of lists, delivering at least one other disparity motion vector, applying the second function both to said first disparity motion vector delivered and the at least one other disparity motion vector delivered, the first, second and third functions being of a same function type.

12. The coding method as claimed in claim 10, comprising, prior to said act of applying the first function, limiting, in the at least one list, the number of disparity motion vectors.

13. The coding method as claimed in claim 12, said limiting comprises:

checking, in the at least one of list of disparity motion vectors in which at least two disparity motion vectors have been derived respectively according to at least two different estimation methods, whether at least two disparity motion vectors are redundant with respect to their amplitude and orientation, deleting from said at least one list one of said at least two disparity motion vectors, if the check is positive.

14. The coding method as claimed in claim 10, wherein said at least two different estimation methods are selected from the group consisting of Depth Map Disparity Vector (DMDV), Disparity-Compensated Prediction (DCP), Neighbor Disparity Vector (NBDV), Flexible Coding Order (FCO) and Depth Oriented Neighbor Disparity Vector (DoNBDV).

15. A device for coding a current image at a current time instant comprising at least two views which are respectively representative of a same scene, said coding device comprising:

a processor; and a non-transitory computer-readable medium comprising instructions stored thereon, which when executed by the processor configure the processor to:

construct a plurality of lists of disparity motion vectors, said plurality of lists comprising at least one list in which at least two disparity motion vectors have been derived respectively according to at least two different estimation methods, apply a first function the disparity motion vectors of each list to obtain one intermediate disparity motion vector per list, wherein the first function is applied to said at least two disparity motion vectors of said at least one list in which at least two disparity motion vectors have been derived respectively according to at least two different estimation methods, apply a second function to said intermediate disparity motion vectors of said plurality of lists to deliver a final derived disparity motion vector, and predictively code a current block of a current view of the current image according to combine said final derived disparity motion vector.

16. A non-transitory computer-readable storage medium on which is stored a computer program comprising program code instructions for execution of a method when said program is run by a computer, wherein said instructions comprise:

instructions that configure the computer to code a current image at a current time instant, which comprises at least two views that are respectively representative of a same scene, wherein coding comprises:

deriving a disparity motion vector, referred to as a final derived disparity motion vector, for a current block of a current view of the current image;

predictively coding the current block according to said final derived disparity motion vector, and during said deriving performing acts of:

constructing a plurality of lists of disparity motion vectors, said plurality of lists comprising at least one list in which at least two disparity motion vectors have been derived respectively according to at least two different estimation methods, applying a first function to the disparity motion vectors of each list to obtain one intermediate disparity motion vector per list, wherein the first function is applied to said at least two disparity motion vectors of said at least one list in which at least two disparity motion vectors have been derived respectively according to at least two different estimation methods, and applying a second function to said intermediate disparity motion vectors of said plurality of lists to deliver the final derived disparity motion vector.

* * * * *